(12) United States Patent
Bousfield, III (10) Patent No.: US 10,797,611 B2
(45) Date of Patent: Oct. 6, 2020

(54) DIAGNOSTICS FOR MULTI-LEVEL MEDIUM VOLTAGE DRIVE USING MECHANICAL BYPASS

(75) Inventor: John Channing Bousfield, III, Murrysville, PA (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 989 days.

(21) Appl. No.: 13/589,228

(22) Filed: Aug. 20, 2012

(65) Prior Publication Data

US 2014/0049995 A1 Feb. 20, 2014

(51) Int. Cl.
*H02H 7/10* (2006.01)
*H02M 5/293* (2006.01)
(Continued)

(52) U.S. Cl.
CPC ...... *H02M 5/293* (2013.01); *H02M 2001/325* (2013.01); *H02M 2007/4835* (2013.01)

(58) Field of Classification Search
CPC ......... H02M 5/293; H02M 2007/4835; H02M 2001/325; H02M 1/32; H02M 1/36; H02M 5/29; H02M 7/483; H02M 7/49; H02M 5/458; H02H 7/10; H02H 7/1213; H02H 7/127; H02H 7/12; H01H 51/01; H01M 10/48; H01M 10/44
(Continued)

(56) References Cited

U.S. PATENT DOCUMENTS 5,625,545 A 4/1997 Hammond
5,952,815 A * 9/1999 Rouillard ............ H02J 7/0016
320/116
(Continued)

FOREIGN PATENT DOCUMENTS

CN 1244745 A 2/2000
CN 1983784 A 6/2007
(Continued)

OTHER PUBLICATIONS

PCT International Search Report dated Oct. 28, 2014 corresponding to PCT International Application No. PCT/US2013/055696 filed Aug. 20, 2013 (16 pages).

*Primary Examiner* — Jermele M Hollington
*Assistant Examiner* — Suresh K Rajaputra (57) ABSTRACT

A system and method for performing diagnostics in a medium voltage drive. The system includes a power cell and a bypass mechanism. The bypass mechanism is operably connected to output terminals of the power cell and configured to create a shunt path between the output terminals. The bypass mechanism includes a communication interface configured to transmit a bypass signal to a communication interface associated with the power cell in response to a state change. The method of performing diagnostics includes a controller transmitting an input voltage to a bypass mechanism of the power supply, thereby causing a state change of the bypass mechanism. The controller receives a signal from the power cell, wherein the signal indicates the power cell has detected the state change of the bypass mechanism. The controller then determines if the power cell is correctly associated with the bypass mechanism.

6 Claims, 6 Drawing Sheets

(51) Int. Cl.
*H02M 1/32* (2007.01)
*H02M 7/483* (2007.01)

(58) Field of Classification Search
USPC .......................................................... 324/537
See application file for complete search history.

(56) References Cited

U.S. PATENT DOCUMENTS

| | | | | |
|---|---|---|---|---|
| 8,008,923 B2 * | 8/2011 | Hammond | ............ | H01M 10/44 320/116 |
| 2002/0031293 A1 * | 3/2002 | Constantino | .......... | H01L 31/125 385/14 |
| 2008/0081244 A1 * | 4/2008 | Hammond | ............ | H01M 10/44 429/61 |
| 2010/0301975 A1 * | 12/2010 | Hammond | ............ | H02M 7/483 335/185 |

FOREIGN PATENT DOCUMENTS

| | | |
|---|---|---|
| CN | 101855695 A | 10/2010 |
| JP | H02202324 A | 8/1990 |
| RU | 2289191 C1 | 12/2006 |
| WO | 9905767 A1 | 2/1999 |
| WO | 0131770 A1 | 5/2001 |

* cited by examiner

DIAGNOSTICS FOR MULTI-LEVEL MEDIUM VOLTAGE DRIVE USING MECHANICAL BYPASS

BACKGROUND

The present disclosure relates to mechanical bypass among multiple power cells in a medium voltage drive. More specifically, the present disclosure relates to a system and method of providing communication between a power cell, a mechanical bypass and a controller to determine a current bypass status of the power cell.

Power supplies configured to control a flow of energy between a first alternating current (AC) system and a second AC system are used in a variety of commercial and industrial applications. For example, a power supply is typically used in AC motor control and operation systems. Various power supplies convert energy from a first frequency and voltage to a second frequency and voltage. One way to implement such a power supply is a drive including one or more power cells, each power cell including multiple solid state converters with an intermediate direct current (DC) link. An exemplary power cell may be an electrical device having a three-phase AC input and a single-phase AC output. One exemplary system incorporating such power cells is discussed in U.S. Pat. No. 5,625,545 to Hammond, the disclosure of which is hereby incorporated by reference in its entirety.

Figure 1:
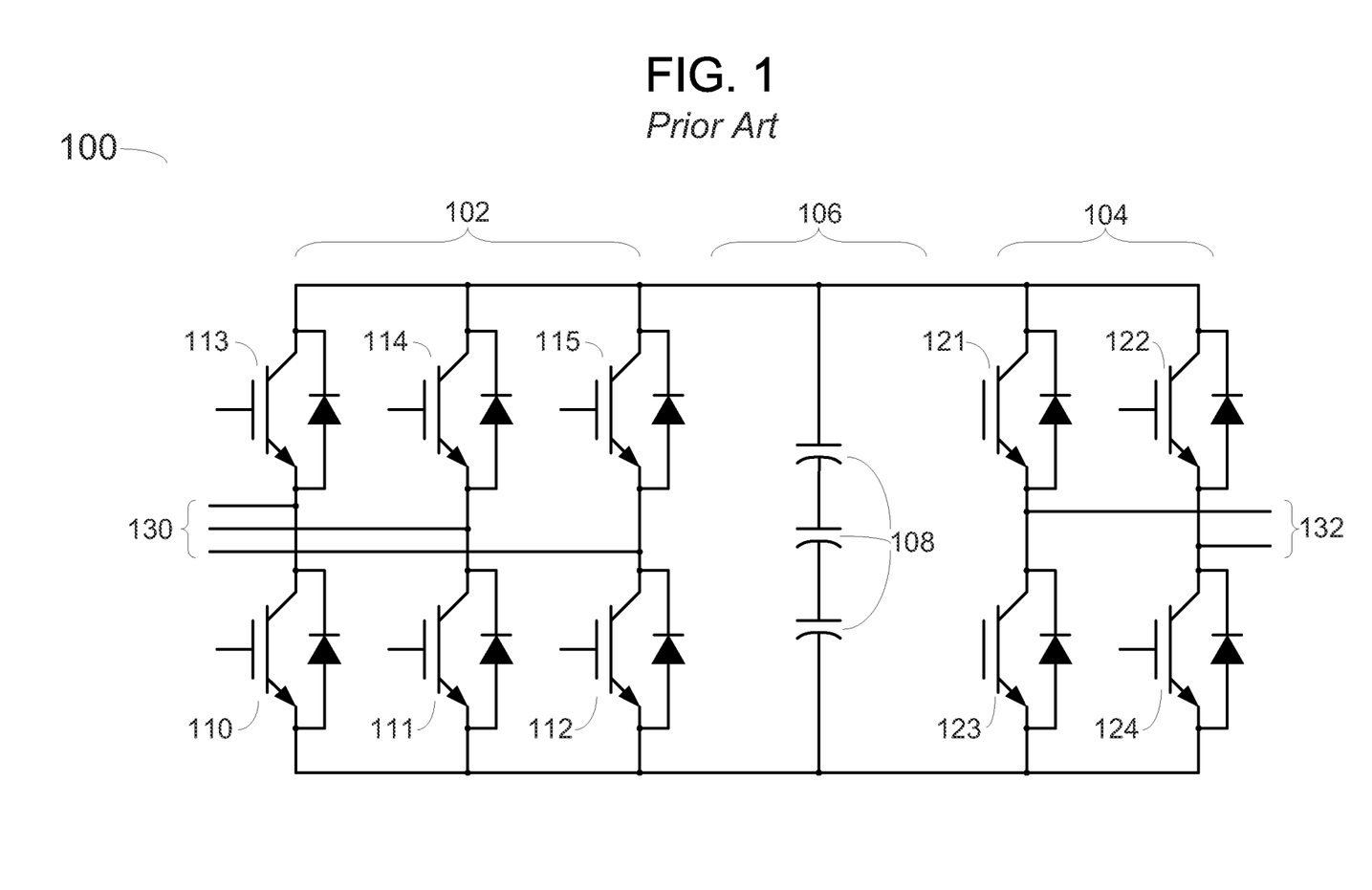
FIG. 1 illustrates a circuit diagram showing exemplary characteristics of a power cell having bidirectional switching devices.

For example, referring to FIG. 1 herein, a power cell 100 includes an active front end 102 that serves as a three-phase bridge as it receives power from dedicated three-phase secondary windings of the transformer via an input 130. The cell 100 also includes a plurality of input switches 110-115, which may be bidirectional current-controlling devices such as IGBTs or other transistors, thyristors, or other switching devices. Although six transistors in a bridge format—in this example, three pairs of two transistors each connected in parallel across the DC terminals—are illustrated in FIG. 1, other numbers and types of input switches may be used. The input switches control the DC bus voltage in the cell. A DC filter section 106 includes one or more capacitors 108. The remainder of the cell may include an output section 104 such as an H-bridge inverter made up of four output switches 121-124, each connected across the output or DC terminals of the active front end 102 and the DC filter 106, to deliver AC power to the output 132.

Figure 2:
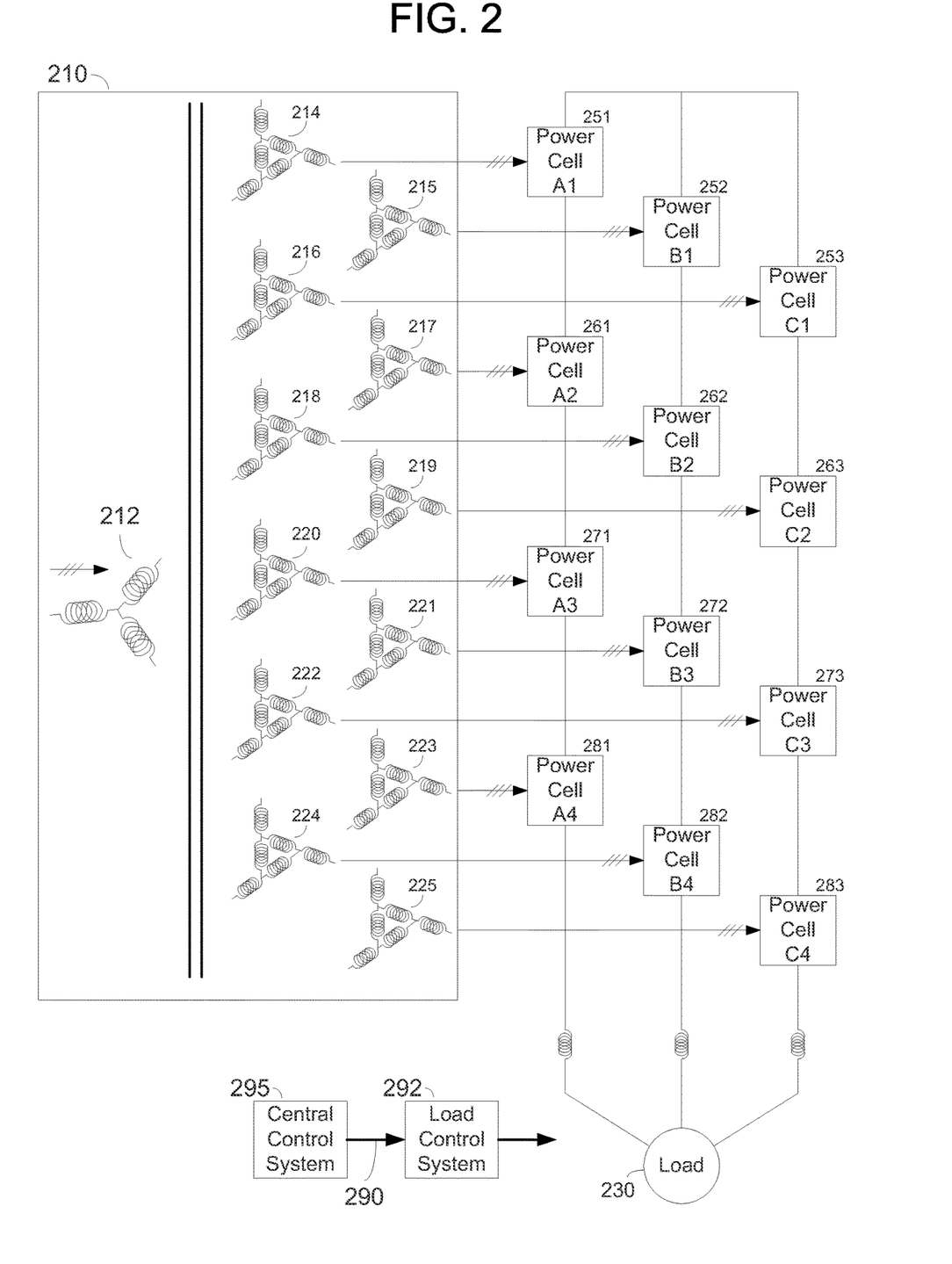
FIG. 2 illustrates a circuit comprising a plurality of power cells connected to a load.

FIG. 2 illustrates an exemplary embodiment of a circuit having such power cells. In FIG. 2, a multi-winding machine such as a source or input transformer 210 delivers three-phase, medium-voltage power to a load 230 such as a three-phase induction motor via an array of single-phase inverters (also referred to herein as power cells). As used herein, the "transformer" is intended to include any multi-winding machine that is normally on the supply side of the system. The transformer 210 may include primary windings 212 that excite a number of secondary windings 214-225. Although primary winding 212 is illustrated as having a star configuration, a mesh configuration is also possible. Further, although secondary windings 214-225 are illustrated as having a mesh configuration, star-configured secondary windings are possible, or a combination of star and mesh windings may be used. Further, the number of secondary windings illustrated in FIG. 2 is merely exemplary, and other numbers of secondary windings are possible.

Any number of three-phase sets of power cells may be connected between the transformer 210 and the load 230. The power cells may include cells such as those having a configuration of that shown in FIG. 1, or the power cells may include cells having one or more other configurations. Referring to FIG. 2, the system may include a first set or "rank" of power cells 251-253 across the three phases of the load, a second rank of power cells 261-263, a third rank of power cells 271-273, and a fourth rank of power cells 281-283. Fewer than four sets or ranks, or more than four sets or ranks, are possible. A master or central control system 295 sends command signals to a local controller 292 and/or cell-level controls in each cell over fiber optics or another wired or wireless communications medium 290. Both the local controller 292 and the central control system 295 may be a processing device having an associated memory configured to store instructions, algorithms and equations used to perform various calculations. Similarly, both local controller 292 and the central control system 295 may include input/output devices configured to receive and transmit data between various components.

Referring to both FIGS. 1 and 2, direct current may be delivered to the DC filter 106, and alternating current may be delivered to the output 132 of a cell, based on controlling signals that the transistors 121-124 and 110-115 receive from local controller 292. The local controller 292 may select which transistors will be OFF or ON, thus modulating the power that is delivered to the output 132 Optionally, communications circuits such as fiber-optic modulator control links 290 may be used to electrically isolate all circuits in any one cell from all circuits in any other cell, and to reduce electromagnetic interference effects which may be imposed between local controller 292 and central control system 295. The local controller 292 can receive power from a local control power source which may be electrically connected to the secondary winding circuit input.

In a multi-cell power supply, each power cell may further include a bypass mechanism. When a given power cell of a multi-cell power supply fails in an open-circuit mode, the current through all the power cells in that phase-group will go to zero, and further operation is not possible. A power cell failure may be detected by comparing a cell output voltage to the commanded output, by checking or verifying cell components, through the use of diagnostics routines, etc. In the event that a given power cell should fail, it is possible to bypass the failed power cell and continue to operate the multi-cell power supply at reduced capacity. This document describes a system and method that improves detection of bypass operations, faults or improper connections within a power cell.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a system, the system including a power cell and a bypass mechanism. The power cell includes a first output terminal, a second output terminal and a first communication interface. The bypass mechanism is operably connected to the first output terminal and the second output terminal and configured to create a shunt path between the first output terminal and the second output terminal, the bypass mechanism including a second communication interface configured to transmit a bypass signal to the first communication interface in response to a change in state of the bypass mechanism.

In another general respect, the embodiments disclose a power supply including a multi-winding device having a primary winding and a plurality of three-phase secondary windings, a controller, a plurality of power cells operably connected to controller, wherein each power cell is connected to a different three-phase secondary winding of the multi-winding device, and a plurality of bypass mechanisms. Each of the plurality of power cells includes a first output terminal and a second output terminal, and a first communication interface. At least one of the plurality of bypass mechanisms is operably connected to an associated one of the plurality of power cells and configured to create a shunt path between the first output terminal and the second output terminal, each of the plurality of bypass mechanisms including a second communication interface configured to transmit a bypass signal to the first communication interface of the associated power cell in response to a change in state of the bypass mechanism.

In another general respect, the embodiments disclose a method of performing diagnostics on a power supply. The method includes transmitting, by a controller, an input voltage to a bypass mechanism of the power supply, wherein the input voltage causes a state change of the bypass mechanism; receiving, by the controller, a signal from a power cell, wherein the signal indicates the power cell has detected the state change of the bypass mechanism; and determining, by the controller, if the power cell is associated with the bypass mechanism.

I. DETAILED DESCRIPTION

In various embodiments, a power cell and bypass mechanism includes a signaling or other feedback mechanism used to verify to a controller which power cell was bypassed. In one embodiment, a closed-loop system results between the power cell, bypass mechanism and the controller such that the controller may ver the proper power cell was bypassed based upon feedback from both the power cell and the bypass mechanism. For example, a communication link may be established between the power cell and the bypass mechanism such that a master controller operably connected to both the power cell and the bypass mechanism may quick ascertain whether the power cell has been correctly bypassed. The communication link may be a photo-diode and detector pair powered by the voltage applied to the bypass coil. Alternatively, the communication link may be a bi-directional data link between the power cell and the bypass mechanism. The communication link may be wireless or wired depending on the arrangement and implementation of the various components.

Figure 3:
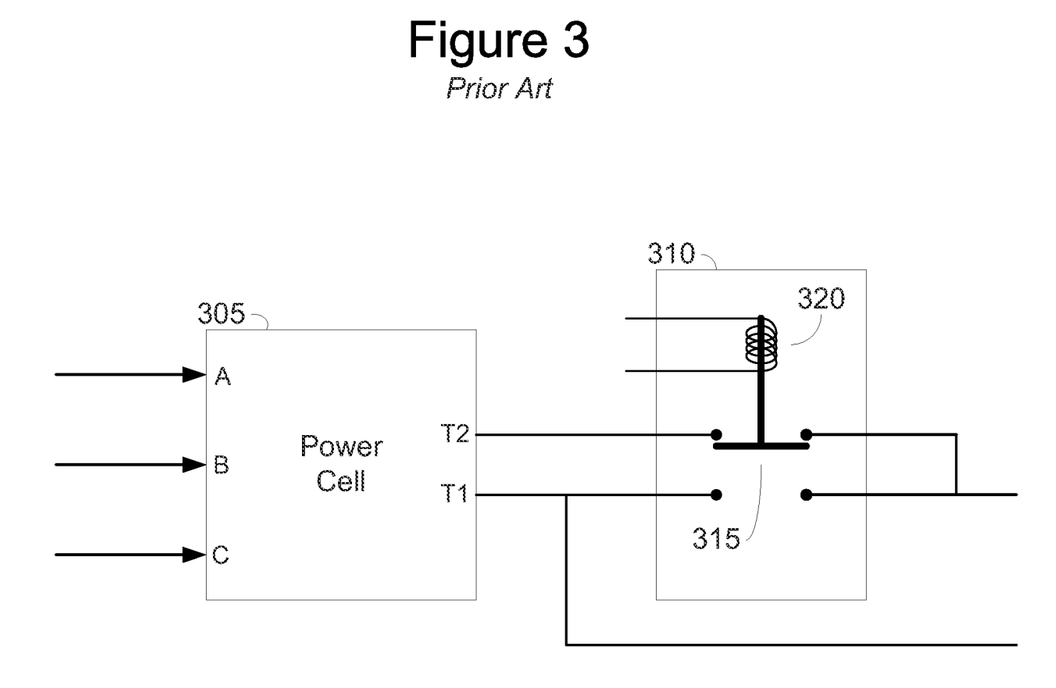
FIG. 3 illustrates an exemplary power cell and bypass mechanism arrangement.

FIG. 3 illustrates an exemplary bypass mechanism 310 connected to output terminals T1 and T2 of a power cell 305. As shown in FIG. 3, the bypass mechanism 310 is a double pole single throw (DPST) contactor, and includes a contact 315 and a coil 320. As used herein, the term "contact" generally refers to a set of contacts having stationary portions and a movable portion. Accordingly, the contact 315 includes stationary portions and a movable portion which is controlled by the coil 320 and configured to alternatively move between the stationary portions between a normal operation mode and a bypass mode, i.e., a mode where the output of the power cell is bypassed. The bypass mechanism 310 may be separately mounted from the power cell 305 but in close proximity to the power cell. When the movable portion of the contact 315 is in a bypass position, a shunt path is created between the phase terminals, which effectively removes the power cell from the output circuit. Stated differently, when the movable portion of the contact 315 is in a bypass position, the output of the drive at the failed power cell is shorted. Thus, when power cell 305 experiences a failure, current from other power cells in the phase group can be carried through the bypass mechanism 310 connected to the failed power cell 305 instead of through the failed power cell 305 itself. One exemplary system incorporating such bypassing mechanisms is discussed in U.S. patent application Ser. No. 11/857,880 filed Sep. 19, 2007 and entitled "Method for Bypassing a Power Cell of a Power Supply," the disclosure of which is hereby incorporated by reference in its entirety.

Figure 4:
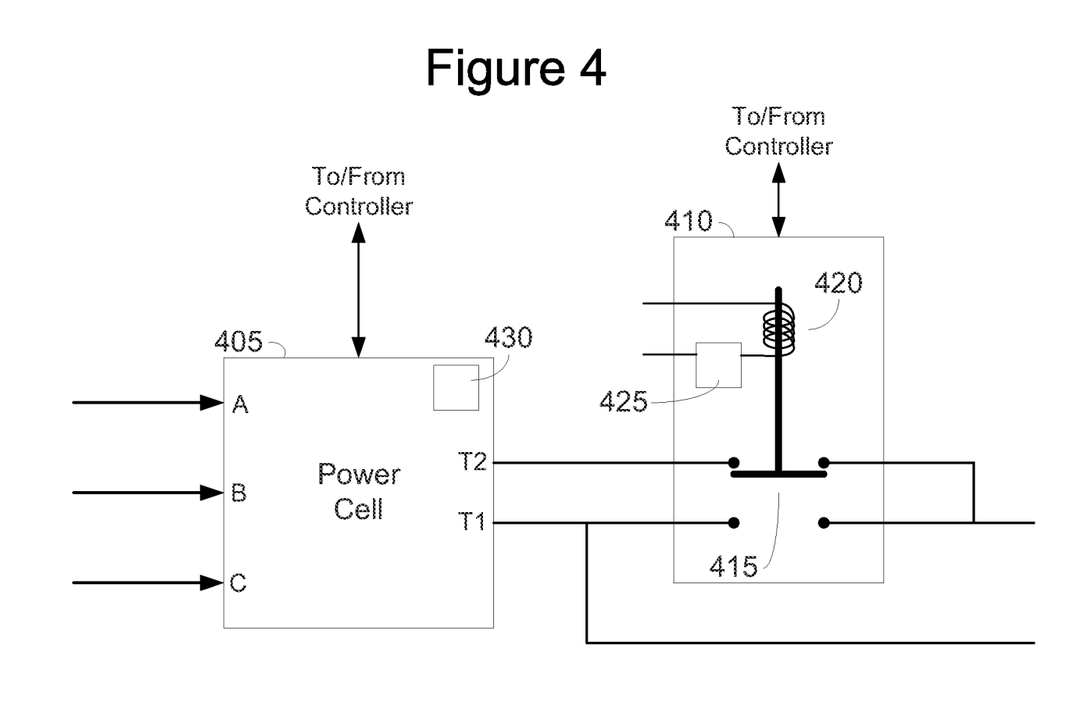
FIG. 4 illustrates an exemplary power cell and bypass mechanism arrangement according to an embodiment.

FIG. 4 illustrates a system including a closed-loop system for monitoring and verify whether a power cell has been property bypassed. The closed-loop system includes a bypass mechanism 410 connected to output terminals T1 and T2 of a power cell 405 wherein a unidirectional communication link is established between the power cell and the bypass mechanism when the bypass mechanism is activated. Typically, the bypass mechanism 410 is a double pole single throw (DPST) contactor, and includes a movable contact 415 and a coil 420. In this example, the power cell 405 and the bypass mechanism 410 also include a communication link including a first communication interface and a second communication interface. The first communication interface may be a photo-diode 425 operably connected to the input voltage connected to the coil 420. When a controller determines that the power cell 405 should be bypassed, the coil 420 may energized by the controller (e.g., master controller 295 as shown in FIG. 2), moving the movable contact 415 and resulting in the bypass mechanism 410 changing states and bypassing the output of the power cell 405.

When the coil 420 is energized to cause movement of the movable contact 415, the voltage passing through the photo-diode 425 may cause the photo-diode to emit light. This emitted light may be detected by a photo-detector 430 at the power cell, thereby indicating to the power cell that the bypass mechanism has changed states. For example, the bypass mechanism may change from normal operating position to a bypass position, thereby creating a short across the output circuit around the power cell, functionally removing the power cell from the operation of the power supply. Alternatively, the bypass mechanism may change states from bypass position to normal operating position, thereby removing the short across the output circuit around the power cell and returning the power cell to operation within the power supply.

Depending on the arrangement of the power cell 405 and the bypass device 410, the photo-detector 430 may be positioned such that it directly detects the light emitted by the photo-diode 425. However, if there is no direct line of sight between the power cell 405 and the bypass mechanism 410, or if there is light pollution from other light sources, a transitory medium such as an optical fiber may be used to link the photo-diode 425 and the photo-detector 430, thereby reducing or eliminating the chance of the photo-detector detecting light from another source.

One or both of the power cell 405 and the bypass mechanism 410 may report to the controller regarding the bypass, thus resulting in a closed-loop system including the controller, the bypass mechanism and the power cell. For example, the bypass mechanism 410 may send an output to the controller indicating it has moved into the bypass position. Similarly, the power cell 405 may send an output to the controller indicating it has received an indication its associated bypass mechanism 410 has been activated. The controller may receive these outputs and determine if the correct power cell 405 has been bypassed. In the event that an incorrect power cell reports being bypassed, the controller may indicate a bypass error to an operator of the power supply and enter a safe operations mode or shut down the power supply entirely.

Based upon the outputs from both the power cell 405 and the bypass mechanism 410, the controller may determine various information. For example, if the controller receiving information from a power cell indicating an improper bypass, a check of the remaining power cells may determine which of the power cells was inadvertently bypassed. Thus, any wiring errors may be determined based upon a comparison of the expected power cell to be bypassed and the actual power cell that has been bypassed.

Figure 5:
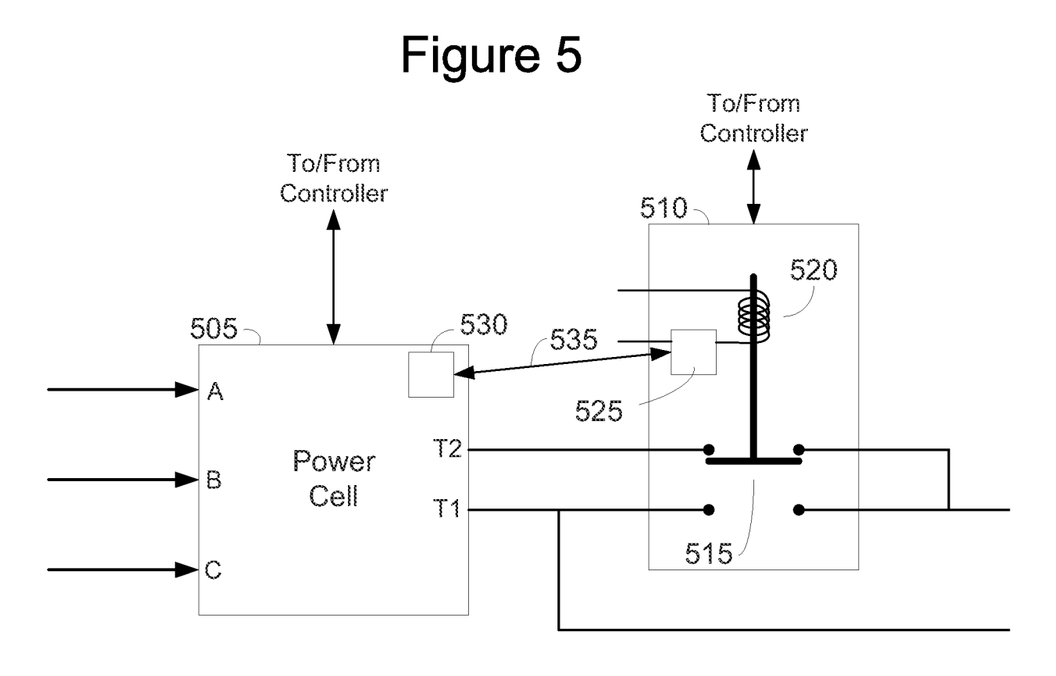
FIG. 5 illustrates an alternative exempla power cell and bypass mechanism arrangement according to an embodiment.

FIG. 5 illustrates an additional system including a closed-loop system for monitoring and verifying whether a power cell has been properly bypassed. The closed-loop system includes bypass mechanism 510 connected to output terminals T1 and T2 of a power cell 505 wherein a bi-directional communication link is established between the power cell and the bypass mechanism. In this example, the power cell 505 and the bypass mechanism 510 may include a communication link including a first communication interface 525 and a second communication interface 530. Each of the first communication interface 525 and the second communication interface 530 may be processing devices configured to collect and transmit/receive information. Thus, a bi-directional communication link 535 may be established between the power cell 505 and the bypass mechanism 510. Information specific to the power cell 505 may be transmitted by the second communication interface 530 to the bypass mechanism 510 via the link 535. Alternatively, information specific to the bypass mechanism 510 may be transmitted by the first communication interface 525 to the power cell 505 via the link 535. This allows for a single connection to the controller from either the power cell 505 or the bypass mechanism 510. In a power supply with multiple power cells and bypass mechanisms, this may substantially reduce the number of communication lines going to the controller, thus reducing the potential of a failure in one of the controller communication lines. However, for redundancy, additional connections to the controller may be provided.

Similar to above, when the controller determines power cell 505 should be bypassed, the coil 520 may energized by the controller, moving the movable contact 515 and resulting in the bypass mechanism 510 changing states and bypassing the output of the power cell 505.

Additionally, in the configuration as shown in FIG. 5, the power cell 510 may control its own bypass. If the power cell 505 detects locally it is malfunctioning, the power cell may send an indication to the bypass device 510 to change states, thereby bypassing the malfunctioning power cell. The power cell may use internal power to activate the coil 520, thereby moving the contact 515 into a bypass position.

When the state of the bypass device 510 changes, the bypass device may send an indication to the power cell 505 of the change. As before, one or both of the power cell 505 and the bypass mechanism 510 may report to the controller regarding the bypass, thus again creating a closed-loop system including the controller, bypass mechanism and power cell. If the power cell 505 and bypass mechanism are sharing a single connection to the controller, a single output may be sent to the controller indicating both the bypass mechanism state change and the power cell being bypassed. The controller may confirm this is the correct power cell 505 and bypass mechanism combination or, as above, perform additional diagnostic steps to identify any errors.

Figure 6:
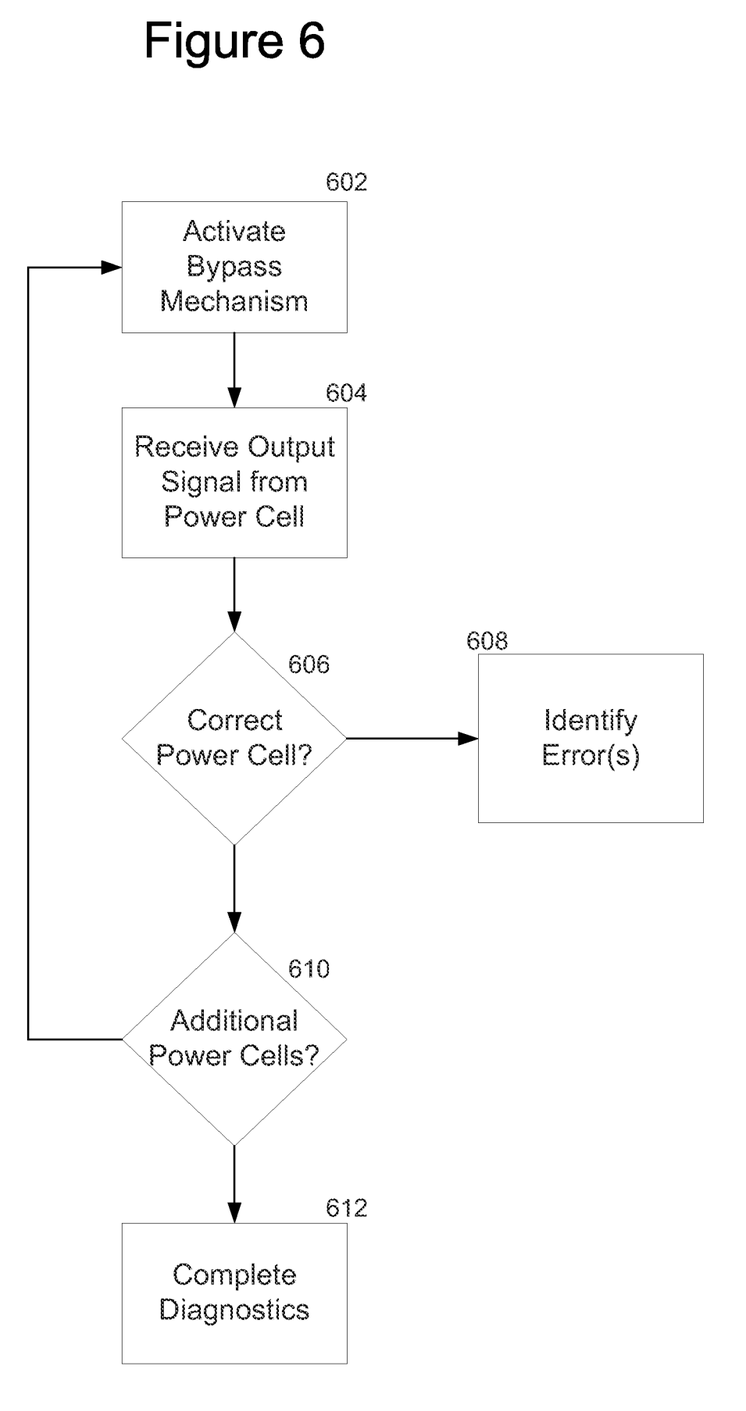
FIG. 6 illustrates an exemplary process for performing diagnostics on a power cell and bypass mechanism arrangement according to an embodiment.

FIG. 6 illustrates an exemplary process for a controller to perform various diagnostics on a power cell and bypass mechanism set of components. The controller may send a signal to a bypass mechanism, thereby activating 602 the bypass mechanism and causing the bypass mechanism to change states. As outlined above, this state change may cause the bypass mechanism to signal an associated power cell of the state change. In response to the bypass signal, the power cell may transmit an output to the controller. The controller may receive 604 the output from the power cell and determine 606 if the power cell is the correct power cell associated with the activated 602 bypass mechanism. For example, during installation of the power supply, the controller may be programmed with a list of power cell identifiers and associated bypass mechanisms. Based upon this listing, the controller may determine 606 if the signaling power cell is associated with the appropriate bypass mechanism.

If the controller determines 606 the power cell is incorrect, the controller may perform additional diagnostics to identify 608 any potential errors. For example, the controller may perform a check of the remaining power cells may determine which of the power cells was inadvertently bypassed. Thus, any wiring errors may be identified 608 based upon a comparison of the expected power cell to be bypassed and the actual power cell that has been bypassed.

If the controller determines 606 the associated power cell is correct, the controller may determine 610 if there are additional power cells and associated bypass mechanisms to test. If there are additional power cells and associated bypass mechanisms to test, the controller may activate another bypass mechanism. If the controller determines 610 there are no additional power cells, the controller may complete 612 the diagnostics. Completing 612 the diagnostics may include returning all bypass mechanisms to their non-bypassed state, and starting (or resuming) normal operation of the power supply. Additionally, the controller or software associated with the controller may produce a report for review by an operator of the power supply.

It should be noted the process as shown in FIG. 6 is shown by way of example only. As currently arranged, the process as shown in FIG. 6 would be beneficial to perform during startup or maintenance periods as various of the power cells are shut off sequentially. However, a similar diagnostic process may be used during standard operation of the power supply where power cells are bypassed and tested at non-peak performance times when the loss of a power cell's production is not detrimental to the operation of the power supply.

Various of the above-disclosed and other features and functions, or alternatives thereof may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A closed-loop system for monitoring and verifying a bypass condition of a power cell, the system comprising:
    a power cell comprising:
        a first output terminal and a second output terminal, and
        a first communication interface positioned at the power cell; and
    a bypass mechanism operably connected to the first output terminal and the second output terminal and configured to create a shunt path between the first output terminal and the second output terminal, the bypass mechanism comprising a second communication interface positioned at the bypass mechanism and configured to establish a communication link to the first communication interface and to transmit a bypass signal to the first communication interface in response to a change in state of the bypass mechanism,
    wherein the bypass mechanism is further adapted to change its state in response to an input voltage received from a controller and to send an output to the controller indicating that the bypass mechanism has changed its state,
    wherein the power cell is adapted to transmit a signal to the controller, wherein the signal indicates that the power cell has detected the state in change of the bypass mechanism based on the bypass signal,
    wherein both the bypass mechanism and the power cell report to the controller regarding the change in state thus resulting in a closed-loop system including the controller, the bypass mechanism and the power cell.

2. The system of claim 1, wherein the first communication interface comprises a photo-detector.

3. The system of claim 2, wherein the second communication interface comprises a photo-diode configured to produce and direct light at the photo-detector.

4. The system of claim 1, wherein the power cell is operably connected to the controller.

5. The system of claim 1, wherein the first communication interface and the second communication interface are configured to establish a unidirectional communication link.

6. The system of claim 1, wherein the first communication interface and the second communication interface are configured to establish a bi-directional communication link.

\* \* \* \* \*